(12) United States Patent
Zhou

(10) Patent No.: US 10,337,555 B2
(45) Date of Patent: Jul. 2, 2019

(54) FOLDING AND UNFOLDING MECHANISM

(71) Applicant: SHANGHAI HINGWAH HONEYCOMB TECHNOLOGY DEVELOPMENT CO., LTD., Shanghai (CN)

(72) Inventor: Dong Zhou, Shanghai (CA)

(73) Assignee: SHANGHAI HINGWAH HONEYCOMB TECHNOLOGY DEVELOPMENT CO., LTD., Shanghai (CN)

( * ) Notice: Subject to any disclaimer, the term of this patent is extended or adjusted under 35 U.S.C. 154(b) by 0 days.

(21) Appl. No.: 15/775,925

(22) PCT Filed: Jan. 26, 2017

(86) PCT No.: PCT/CN2017/072771
§ 371 (c)(1),
(2) Date: May 14, 2018

(87) PCT Pub. No.: WO2017/129140
PCT Pub. Date: Aug. 3, 2017

(65) Prior Publication Data
US 2018/0328401 A1    Nov. 15, 2018

(30) Foreign Application Priority Data

Jan. 28, 2016 (CN) .......................... 2016 1 0061394
Jan. 28, 2016 (CN) ...................... 2016 2 0088860 U

(51) Int. Cl.
*E05F 1/08* (2006.01)
*F16C 11/10* (2006.01)
(Continued)

(52) U.S. Cl.
CPC ................ *F16C 11/10* (2013.01); *E05F 3/20* (2013.01); *F16C 11/04* (2013.01)

(58) Field of Classification Search
CPC ..... E05F 1/1276; E05F 1/1246; E05F 1/1253; E05F 1/1261; E05F 1/1058; E05F 1/1075;
(Continued)

(56) References Cited

U.S. PATENT DOCUMENTS 3,088,727 A * 5/1963 Pelagatti ............... E05F 11/382
                                                      74/103
4,452,015 A * 6/1984 Jacques ................. E05F 1/1091
                                                      49/344
(Continued)

FOREIGN PATENT DOCUMENTS

CN        202108863        1/2012
CN        202326679        7/2012
(Continued)

OTHER PUBLICATIONS

PCT/CN2017/072771 International Search Report and Written Opinion dated Apr. 26, 2017, 10 pages—Chinese, 3 pages—English.

*Primary Examiner* — Chuck Y Mah
(74) *Attorney, Agent, or Firm* — Andrew F. Young, Esq.; Lackenbach Siegel, LLP

(57) ABSTRACT

The invention discloses a folding and unfolding mechanism. The folding and unfolding mechanism is mounted between an upper panel and a lower panel which are hinged, and is used for folding and unfolding the upper panel and the lower panel, and for overturning for 0-180 degrees between the upper panel and the lower panel; wherein the folding and unfolding mechanism comprises a four-connecting-rod assembly, a pushrod assembly and an auxiliary connecting rod assembly; the auxiliary connecting rod assembly comprises a first auxiliary connecting rod and a second auxiliary connecting rod, wherein one end of the first auxiliary connecting rod is hinged to one end of the second auxiliary connecting rod; the other end of the first auxiliary connecting rod is hinged to the lower panel; and the other end of the (Continued)

second auxiliary connecting rod is fixedly connected with a fourth connecting rod. The invention provides a mechanism, mounted between an upper panel and a lower panel which are hinged together, for folding and unfolding the upper panel and the lower panel, and for overturning for 0-180 degrees between the upper panel and the lower panel.

9 Claims, 6 Drawing Sheets

(51) Int. Cl.
  *F16C 11/04* (2006.01)
  *E05F 3/20* (2006.01)
(58) Field of Classification Search
  CPC .... E05F 3/20; E05F 3/22; E05F 3/221; E05D 3/16; E05D 11/00; E05Y 2201/21; E05Y 2201/264; E05Y 2201/47; E05Y 2201/492; E05Y 2900/20; E05Y 2900/202; A47B 2220/0072; Y10T 16/5383; Y10T 16/547; Y10T 16/5476; F16C 11/10; F16C 11/04
  See application file for complete search history.

(56) References Cited

U.S. PATENT DOCUMENTS

| | | | | |
|---|---|---|---|---|
| 5,664,290 A * | 9/1997 | Scherrer | ............... | E05D 3/06 16/287 |
| 8,065,966 B1 * | 11/2011 | Bacon | ............... | A47B 9/16 108/145 |
| 8,082,629 B2 * | 12/2011 | Migli | ............... | E05D 15/46 16/286 |
| 8,256,064 B2 * | 9/2012 | Blersch | ............... | E05D 3/18 16/286 |
| 8,321,996 B2 * | 12/2012 | Hirtsiefer | ............... | E05D 3/14 16/286 |
| 8,376,480 B2 * | 2/2013 | Brunnmayr | ............... | E05D 3/06 312/319.2 |
| 8,572,811 B2 * | 11/2013 | Lautenschlager | ............... | E05D 3/14 16/370 |
| 8,844,097 B2 * | 9/2014 | Bonomie | ............... | E05F 3/20 16/286 |
| 2001/0039762 A1 * | 11/2001 | Giovannetti | ............... | E05F 1/1091 49/246 |
| 2002/0108311 A1 * | 8/2002 | Salice | ............... | E05D 15/262 49/371 |
| 2007/0266912 A1 * | 11/2007 | Swain | ............... | A47B 9/02 108/145 |

FOREIGN PATENT DOCUMENTS

| | | |
|---|---|---|
| CN | 203255064 | 10/2013 |
| CN | 105545929 | 5/2016 |
| CN | 205503734 | 8/2016 |
| CN | 106082047 | 11/2016 |
| JP | H09177760 | 7/1997 |
| JP | 2000064335 | 2/2000 |

* cited by examiner

FOLDING AND UNFOLDING MECHANISM

CROSS REFERENCE TO PRIORITY CLAIM

This application is a § 371 national phase of Ser. No.: PCT/CN2017/072771 filed Jan. 26, 2017, the entire contents of which is incorporated herein by reference, and which claims priority from CN 201620088860.X filed Jan. 28, 2016 and CN 201610061394.0 filed Jan. 28, 2016.

BACKGROUND OF THE INVENTION

1. Field of the Invention

The invention relates to a technical field of auxiliary structure for panel hinge, and more particularly, to a folding and unfolding mechanism.

2. Description of the Related Art

In general, a hinge is needed when joint connection is involved in two large panels, and a certain power system is necessary for supporting stress and completing folding and unfolding of the panels. In addition, the folding and unfolding mechanism occupies larger space when performing mutually folding and unfolding of 0-180 degrees between two panels, and the mechanism is relatively complex, thus, the mechanism does not work very well in many applications. Therefore, there is a need for an improved folding and unfolding mechanism with simple structure, taking up less space, to solve the above problems existing in the prior art.

SUMMARY OF THE INVENTION

Aiming at the foregoing problems existing in the prior art, the present invention provides a folding and unfolding mechanism.

In order to achieve the above purposes, the present invention adopts the following technical solutions:

A folding and unfolding mechanism, mounted between an upper panel and a lower panel which are hinged together, for folding and unfolding the upper panel and the lower panel, and for overturning for 0-180 degrees between the upper panel and the lower panel, comprising:

a four-connecting-rod assembly, comprising a first connecting rod, a second connecting rod, a third connecting rod and a fourth connecting rod, one end of the first connecting rod being hinged to one end of the second connecting rod, the other end of the first connecting rod being hinged to the upper panel, the other end of the second connecting rod being hinged to the lower panel, and a first hinged joint being formed at a hinged ends of the first connecting rod and the second connecting rod, a middle part of the third connecting rod is hinged to the first connecting rod and the second connecting rod through the first hinged joint, the third connecting rod having a second hinged joint at one end, one end of the fourth connecting rod being hinged to the third connecting rod through the second hinged joint, the third connecting rod being provided with a third hinged joint relative to the other end of the first hinged joint;

a pushrod assembly, comprising a pushrod and a pushing portion, wherein the pushrod is fixedly connected to an other side, which is relative to the third connecting rod, of the fourth connecting rod at one end, and the pushrod is connected to the pushing portion at the other end, the pushing portion being mounted above the lower panel for driving the pushrod to move.

The above folding and unfolding mechanism further comprises:

an axial locking mechanism, comprising an inner sleeve, a middle sleeve and an outer sleeve, wherein the middle sleeve is sleeved outside the inner sleeve, while the outer sleeve is sleeved outside the middle sleeve, and the interior of the inner sleeve is provided with two pawls, one end of each of the two pawls is hinged to each other through a positioning shaft rotatablely connected to an inner wall of two sides of the inner sleeve, also, the two pawls having a compression spring at the other end, and one end of the inner sleeve is hinged to the other end, relative to the third connecting rod, of the fourth connecting rod, and is hinged to the third connecting rod through the third hinged joint;

a start skid, hinged to the outer sleeve at one end through the third hinged joint, the other end of the start skid being facing the upper panel; and a pushing block, arranged at the interior of the outer sleeve, wherein one end of the pushing block is hinged to the other side of the end of the start skid, and the other end of the pushing block abuts against the middle sleeve.

The above folding and unfolding mechanism, wherein the inner sleeve, the middle sleeve and the outer sleeve can slide relatively to each other, and the start skid has an arc surface at a side relative to the other end of the outer sleeve, the arc surface being facing the upper panel.

The above folding and unfolding mechanism, wherein two sides of the middle part of the inner sleeve, two sides of the middle part of the middle sleeve and two sides of the outer sleeve are provided with a through-hole respectively, and pawl parts of the two pawls are respectively running through the through-hole of the inner sleeve, the through-hole of the middle sleeve and the through-hole of the outer sleeve from inside to outside the pawls, and end planes of the pawl parts of the two pawls abut against inner walls of the through-holes at two sides of the inner sleeve, the middle sleeve and the outer sleeve.

The folding and unfolding mechanism, wherein a first convex edge, extending in the form of rib, forms at one side of the first connecting rod, and a second convex edge opposite to the first convex edge is arranged on a surface of the upper panel facing the lower panel; the third connecting rod is generally in the form of triangle, wherein two angles are provided with the first hinged joint and the second hinged joint, respectively, and the third angle is between the first convex edge and the second convex edge when the folding and unfolding mechanism is in a folded state, and abuts against the second convex edge to push the upper panel to perform pre-unfolding when the mechanism is unfolding, moreover, the third angle of the third connecting rod is arc-shaped or is provided with a roller.

The above folding and unfolding mechanism, wherein a rotating shaft is running through the first hinged joint for the hinge of the first connecting rod, the second connecting rod and the third connecting rod.

The above folding and unfolding mechanism, wherein the first hinged joint extends outwards, forming a projection, and when the folding and unfolding mechanism is folding and unfolding, the projection abuts against one side of the fourth connecting rod to limit a relative position of the third connecting rod and the fourth connecting rod.

The above folding and unfolding mechanism, wherein the fourth connecting rod is L-shaped from its side.

The above folding and unfolding mechanism, wherein grooves are formed at opposite surfaces of the upper panel and the lower panel, and the two grooves together form an accommodating space in which the four-connecting-rod assembly is received when the folding and unfolding mechanism is in a folded state.

Since the present invention adopts the above technical solutions, the present invention has the following beneficial effects when compared to the prior art:

1. the present invention provides a mechanism, mounted between an upper panel and a lower panel which are hinged together, for folding and unfolding the upper panel and the lower panel, and for overturning for 0-180 degrees between the upper panel and the lower panel.

2. An axial locking mechanism is added in the present invention, the included angle relative to the axis of an oil cylinder is locked such that the start skid no longer produces relative rotation after the start skid moves to a predetermined position.

BRIEF DESCRIPTION OF THE DRAWINGS

The accompanying drawings, together with the specification, illustrate exemplary embodiments of the present disclosure, and, together with the description, serve to explain the principles of the present invention.

FIG. 1-2 is a partially enlarged view of a folding and unfolding mechanism of the present invention.

FIG. 1-3 is a 90-degree folding schematic view of a folding and unfolding mechanism of the present invention.

FIG. 2-1 is a schematic view of an installation structure of a folding and unfolding mechanism of the present invention.

FIG. 2-2 is a schematic perspective view of a connecting structure of a four-connecting-rod of a folding and unfolding mechanism in the present invention.

FIG. 2-3a is a schematic structural view of the first connecting rod 4 of the folding and unfolding mechanism of the present invention.

FIG. 2-3b is a schematic structural view of the second connecting rod 5 of the folding and unfolding mechanism of the present invention.

FIG. 2-3c is a schematic structural view of the third connecting rod 6 of the folding and unfolding mechanism of the present invention.

FIG. 2-3d is a schematic structural view of the fourth connecting rod 7 of the folding and unfolding mechanism of the present invention.

FIG. 2-4a is a schematic view of a specific application of a folding and unfolding mechanism of the present invention.

FIG. 2-4b is a schematic view of a specific application of a folding and unfolding mechanism of the present invention.

FIG. 2-4c is a schematic view of a specific application of a folding and unfolding mechanism of the present invention.

FIG. 2-4d is a schematic view of a specific application of a folding and unfolding mechanism of the present invention.

Figure 1:
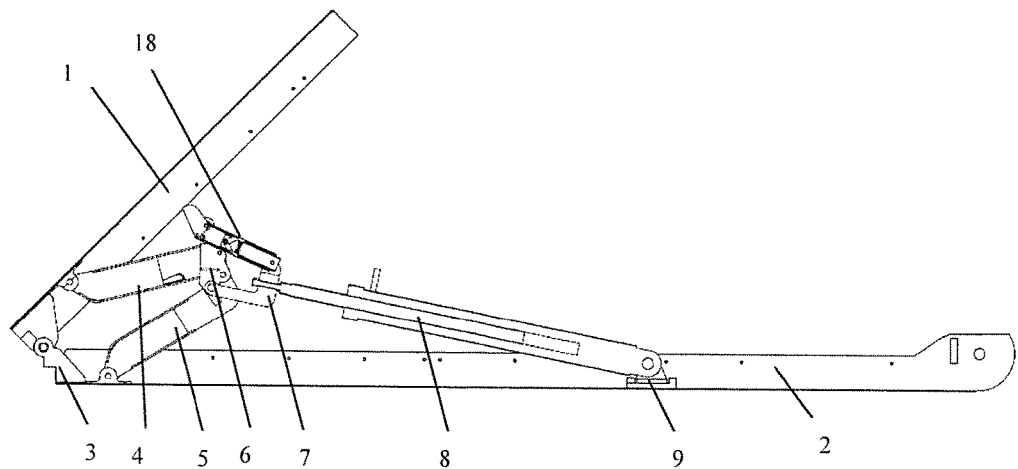
FIG. 1-1 is a schematic view of a folding and unfolding mechanism of the present invention.

In figures: 1 upper panel; 2 lower panel; 3 hinge; 4 first connecting rod; 5 second connecting rod; 6 third connecting rod; 7 fourth connecting rod; 8 pushrod; 9 pushing portion; 10 first hinged joint; 11 second hinged joint; 12 rotating shaft; 13 angle; 14 first convex edge; 15 second convex edge; 16 inner sleeve; 17 middle sleeve; 18 outer sleeve; 181 third hinged joint; 19 pawl; 191 positioning shaft; 192 compression spring; 20 start skid; 201 pushing block

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

First Embodiment

Figures 1, 2:
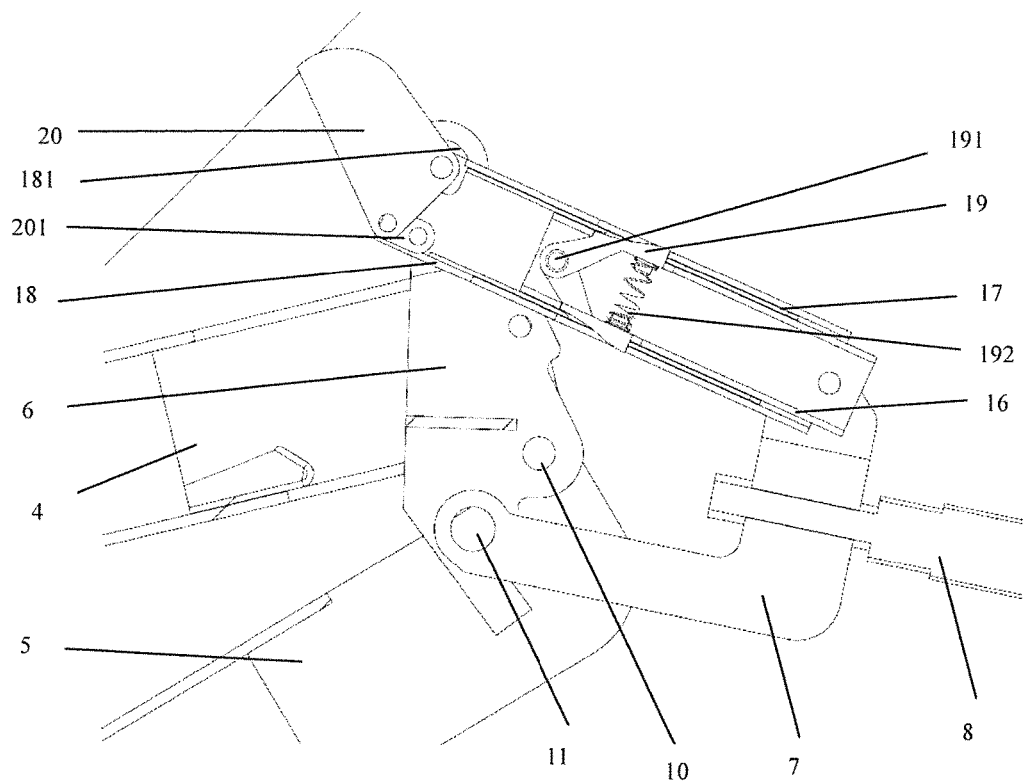
Figures 1, 2, 3:
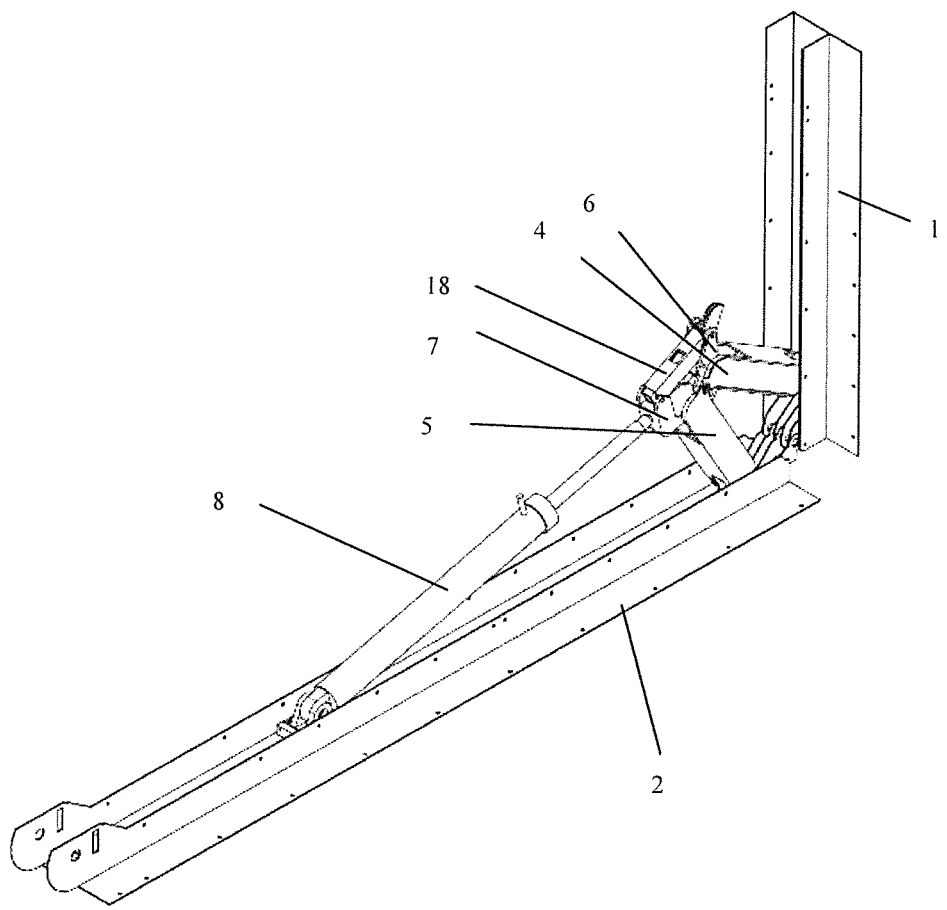
Figures 1, 2:
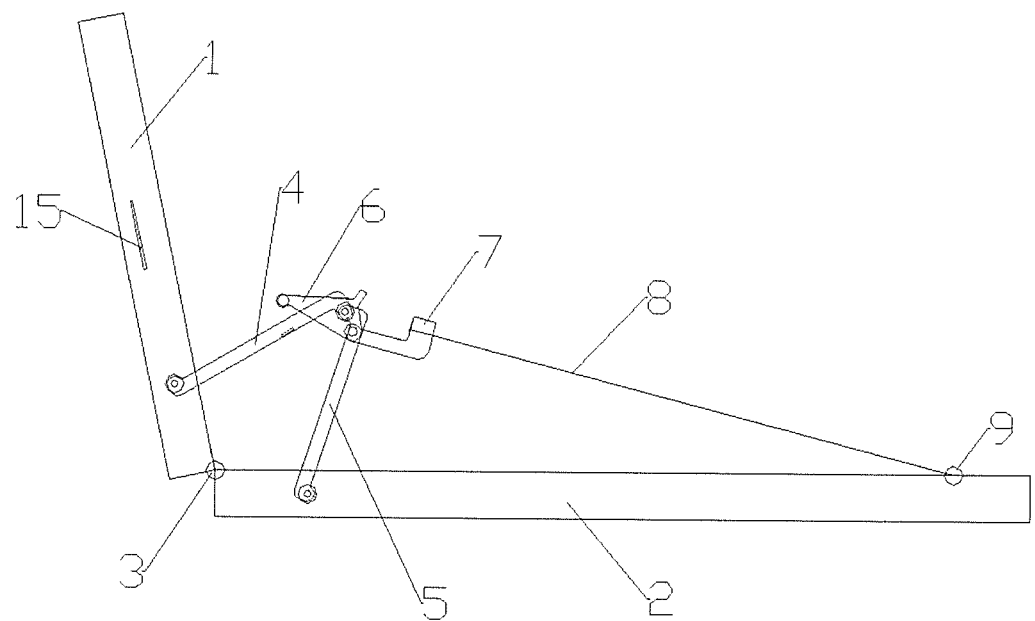
Figure 2:
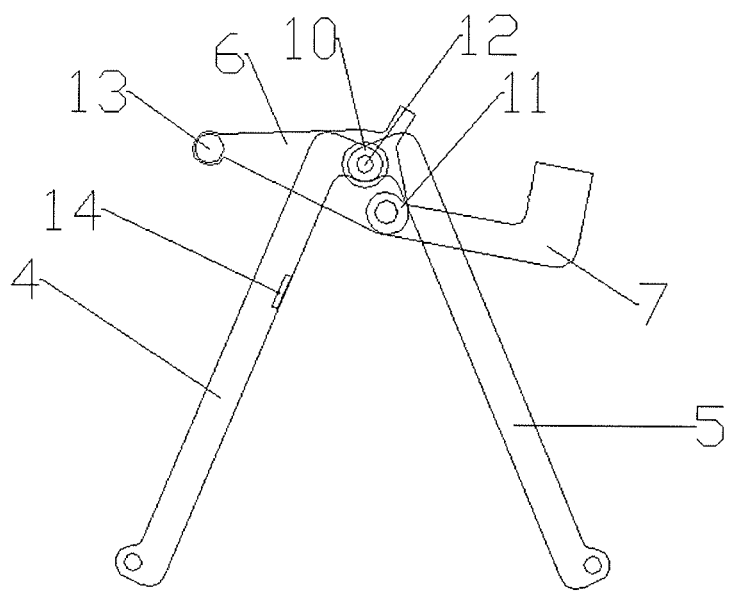
Figures 2, 3, 3A:
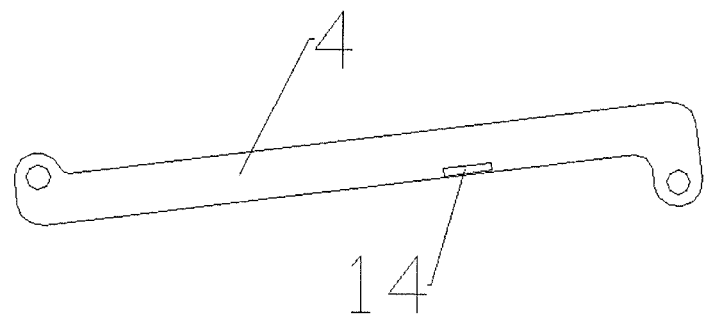
Figures 2, 3, 3B:
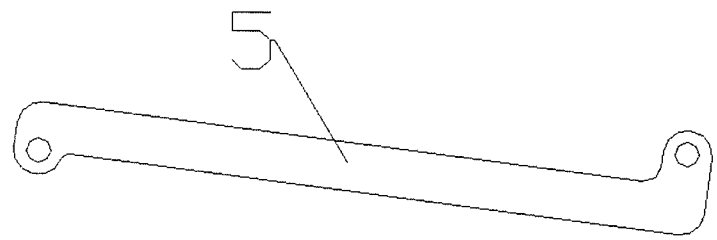
Figures 2, 3, 3C:
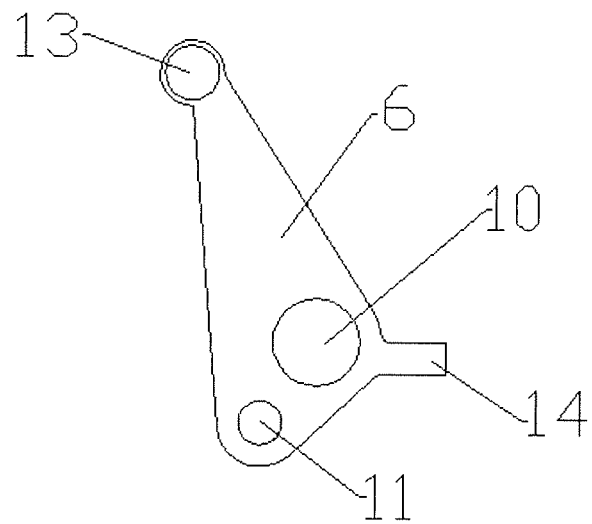
Figures 2, 3, 3D:
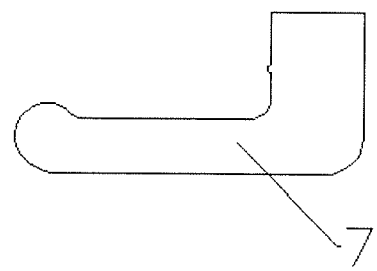
Figures 2, 3, 4, 4A:
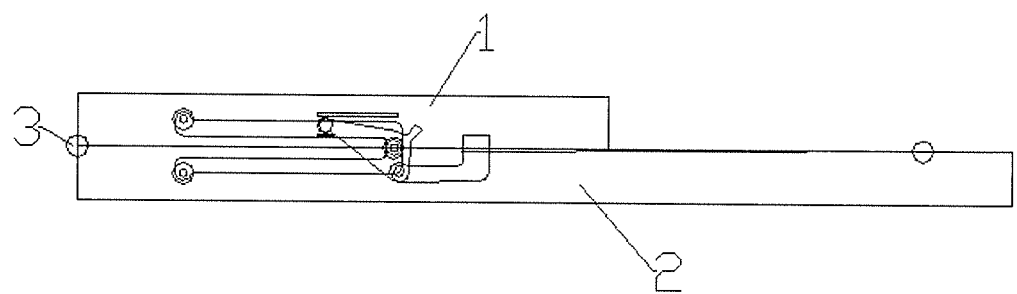
Figures 2, 3, 4, 4B:
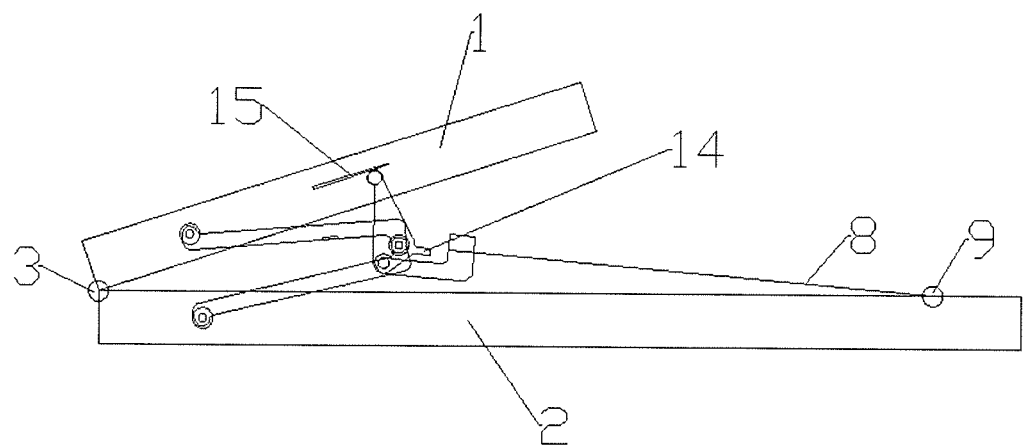
Figures 2, 3, 4, 4C:
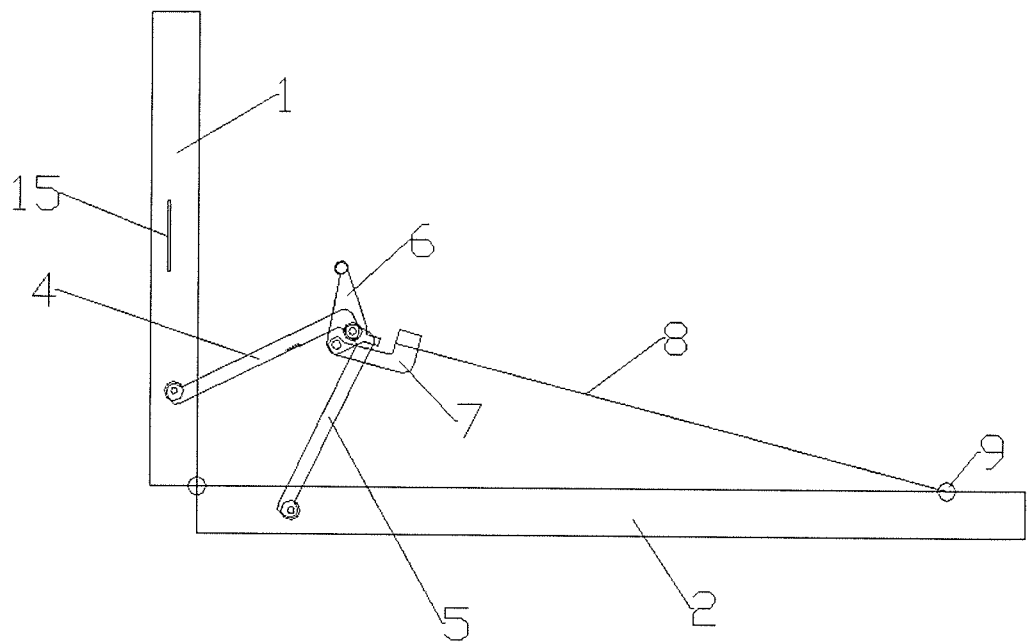
Figures 2, 3, 4, 4D:
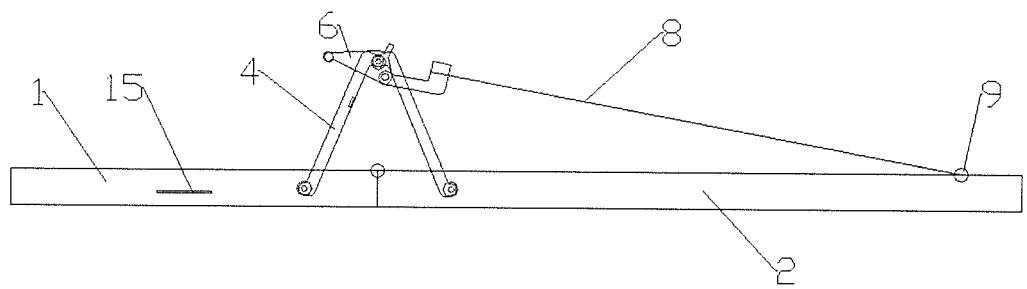

FIG. 1-1 is a schematic view of a folding and unfolding mechanism of the present invention, FIG. 1-2 is a partially enlarged view of a folding and unfolding mechanism of the present invention, and FIG. 1-3 is a 90-degree folding schematic view of a folding and unfolding mechanism of the present invention. FIGS. 1-1, 1-2 and 1-3 show a folding and unfolding mechanism of a preferred embodiment, which is mounted between an upper panel 1 and a lower panel 2 which are hinged together, for folding and unfolding the upper panel 1 and the lower panel 2, and for overturning for 0-180 degrees between the upper panel 1 and the lower panel 2.

Moreover, in a preferred embodiment, the folding and unfolding mechanism comprises: a four-connecting-rod assembly, comprising a first connecting rod 4, a second connecting rod 5, a third connecting rod 6 and a fourth connecting rod 7, one end of the first connecting rod 4 being hinged to one end of the second connecting rod 5, the other end of the first connecting rod 4 being hinged to the upper panel 1, the other end of the second connecting rod 5 being hinged to the lower panel 2, and a first hinged joint 10 being formed at a hinged ends of the first connecting rod 4 and the second connecting rod 5, a middle part of the third connecting rod 6 is hinged to the first connecting rod 4 and the second connecting rod 5 through the first hinged joint 10, the third connecting rod 6 having a second hinged joint 11 at one end, one end of the fourth connecting rod 7 being hinged to the third connecting rod 6 through the second hinged joint 11, the third connecting rod 6 being provided with a third hinged joint 181 relative to the other end of the first hinged joint 10.

Furthermore, in a preferred embodiment, the folding and unfolding mechanism comprises: a pushrod assembly, comprising a pushrod 8 and a pushing portion 9, wherein the pushrod 8 is fixedly connected to an other side, which is relative to the third connecting rod 6, of the fourth connecting rod 7 at one end, and the pushrod 8 is connected to the pushing portion 9 at the other end, the pushing portion 9 being mounted above the lower panel 2 for driving the pushrod 8 to move.

Furthermore, in a preferred embodiment, the folding and unfolding mechanism comprises: an axial locking mechanism, comprising an inner sleeve 16, a middle sleeve 17 and an outer sleeve 18, wherein the middle sleeve 17 is sleeved outside the inner sleeve 16, while the outer sleeve 18 is sleeved outside the middle sleeve 17, and the interior of the inner sleeve 16 is provided with two pawls 19, one end of each of the two pawls 19 is hinged to each other through a positioning shaft 191 rotatablely connected to an inner wall of two sides of the inner sleeve 16, also, the two pawls 19 having a compression spring 192 at the other end, the two pawls 19 are fixed at respective positions in the inner sleeve 17 by the positioning shaft 191. The compression spring 192 ensures the normal opening angle of the pawls 19, and the middle sleeve 17 may control the opening and closing movements of the pawls 19 by moving in an axial direction.

In addition, in a preferred embodiment, one end of the inner sleeve 16 is hinged to the other end, relative to the third connecting rod 6, of the fourth connecting rod 7, and one end of the outer sleeve 18 is hinged to the third connecting rod 6 through the third hinged joint 181;

Furthermore, in a preferred embodiment, the folding and unfolding mechanism comprises: a start skid 20, hinged to the outer sleeve 18 at one end through the third hinged joint 181, the other end of the start skid 20 being facing the upper panel 1.

Furthermore, in a preferred embodiment, a pushing block 201, arranged at the interior of the outer sleeve 18, wherein one end of the pushing block 201 is hinged to the other side of the end of the start skid 20, and the other end of the pushing block 201 abuts against the middle sleeve 17. In order to solve the problem that panels will swing when the start skid 20 reaches 90 degrees of turning point in folding and unfolding movements, an axial locking mechanism is additionally added, the included angle relative to the axis of an oil cylinder of the pushrod 8 is locked such that the start skid 20 no longer produces relative rotation after the start skid 20 moves to a predetermined position.

Moreover, in a preferred embodiment, wherein the inner sleeve 16, the middle sleeve 17 and the outer sleeve 18 can slide relatively to each other.

Furthermore, in a preferred embodiment, wherein two sides of the middle part of the inner sleeve 16, two sides of the middle part of the middle sleeve 17 and two sides of the outer sleeve 18 are provided with a through-hole respectively, and pawl parts of the two pawls 19 are respectively running through the through-hole of the inner sleeve 16, the through-hole of the middle sleeve 17 and the through-hole of the outer sleeve 18 from inside to outside the pawls. Gas-liquid dampers are replaced by stopping means of mechanical lock pawls, which is more intuitive and convenient; synchronous swing of rods will be omitted; the structure is simplified; and easy maintenance and low failure rate can be achieved. Therefore, such a mechanism is more suitable for a structure system with small space.

Furthermore, in a preferred embodiment, end planes of the pawl parts of the two pawls 19 abut against inner walls of the through-holes at two sides of the inner sleeve 16, the middle sleeve 17 and the outer sleeve 18. Mutual positioning of the outer sleeve 18 and the pawl parts of the pawls in the inner sleeve 17 is achieved through opposite opening, so as to complete all the functional movements of the locking mechanism.

The foregoing is only the preferred embodiment of the invention, not thus limiting embodiments and scope of the invention.

The present invention also has the following embodiments based on the above embodiment:

In a further embodiment of the present invention, referring to FIGS. 1 and 2, the start skid 20 has an arc surface at a side relative to the other end of the outer sleeve 18, the arc surface being facing the upper panel 1.

In a further embodiment of the present invention, sides of the fourth connecting rod 7 are L-shaped.

In a further embodiment of the present invention, the upper panel 1 and the lower panel 2 are hinged together by a hinge 3, and can rotate around the hinge 3.

In a further embodiment of the present invention, grooves are formed at opposite surfaces of the upper panel 1and the lower panel 2, and the two grooves together form an accommodating space in which the four-connecting-rod assembly is received when the folding and unfolding mechanism is in a folded state.

In a further embodiment of the present invention, three sleeves are adopted, having the advantages of relatively compact structure and simple appearance and easy maintenance, and having smaller range of movement and smaller stroke while the stroke meets the requirement.

In a further embodiment of the present invention, the sleeve takes the form of, but is not limited to the hollow rectangular body.

The above descriptions are only the preferred embodiments of the invention, not thus limiting the embodiments and scope of the invention. Those skilled in the art should be able to realize that the schemes obtained from the content of specification and drawings of the invention are within the scope of the invention.

Second Embodiment

FIG. 2-1 is a schematic view of the installation structure of a folding and unfolding mechanism of the present invention, FIG. 2-2 is a schematic perspective view of a connecting structure of a four-connecting-rod of a folding and unfolding mechanism in the present invention, FIGS. 2-3a to 2-3d are schematic structural views of four connecting rod of a folding and unfolding mechanism of the present invention, and FIGS. 2-4a to 2-4d are schematic views of specific applications of a folding and unfolding mechanism of the present invention. FIGS. 2-1, 2-2, FIGS. 2-3a to 2-3d and FIGS. 2-4a to 2-4d show a folding and unfolding mechanism of a preferred embodiment, which is mounted between an upper panel 1 and a lower panel 2 which are hinged together, for folding and unfolding the upper panel 1 and the lower panel 2, and for overturning for 0-180 degrees between the upper panel 1 and the lower panel 2.

Moreover, in a preferred embodiment, the folding and unfolding mechanism comprises: a four-connecting-rod assembly, comprising a first connecting rod 4, a second connecting rod 5, a third connecting rod 6 and a fourth connecting rod 7, one end of the first connecting rod 4 being hinged to one end of the second connecting rod 5, the other end of the first connecting rod 4 being hinged to the upper panel 1, the other end of the second connecting rod 5 being hinged to the lower panel 2, and a first hinged joint 10 being formed at a hinged ends of the first connecting rod 4 and the second connecting rod 5, the third connecting rod 6 being hinged to the first connecting rod 4 and the second connecting rod 5 through the first hinged joint 10, the third connecting rod 6 having a second hinged joint 11 at one end, one end of the fourth connecting rod 7 being hinged to the third connecting rod 6 through the second hinged joint 11;

Furthermore, in a preferred embodiment, the folding and unfolding mechanism comprises: a pushrod assembly, comprising a pushrod 8 and a pushing portion 9, wherein one end of the pushrod 8 is connected to the other end of the fourth connecting rod 7, and the pushrod 8 is connected to the pushing portion 9 at the other end, the pushing portion 9 being mounted above the lower panel 2 to drive the pushrod 8 to move, and thus to drive the four-connecting-rod assembly to move, therefore achieving the technical effect of folding and unfolding;

Furthermore, in a preferred embodiment, gaps are formed in opposite surfaces of the upper panel 1 and the lower panel 2, and accommodating space is formed, and the four-connecting-rod assembly is received in the accommodating space in a folded state. The mechanism structure is simplified and is concealed in the two panels without compromising the performance of folding and unfolding movements, thus occupying small space.

Furthermore, in a preferred embodiment, as shown in FIGS. 2-2, 2-3*a*, 2-3*c* and 2-4*b*, a first convex edge 14, extending in the form of a rib, forms at one side of the first connecting rod 4, and a second convex edge 15 opposite the first convex edge 14 is arranged on a surface of the upper panel 1 facing the lower panel 1;

Furthermore, in a preferred embodiment, the third connecting rod 6 is generally in the form of triangle, wherein two angles are provided with the first hinged joint 10 and the second hinged joint 11, respectively, and the third angle 13 is between the first convex edge 14 and the second convex edge 15 when the folding and unfolding mechanism is in a folded state, and abuts against the second convex edge 15 to push the upper panel 1 to perform pre-unfolding when the mechanism is unfolding, such that the triangular third connecting rod 6 is integrally formed into a jacking structure through two hinged joints and one top point, which can effectively solve the problem that the included angle between two connecting rods is so small that thus is insufficient; moreover, the third angle 13 of the third connecting rod is arc-shaped or is provided with a roller, so as to further enhance the effect of transitional auxiliary driving, but it is not limited to this.

Furthermore, in a preferred embodiment, a rotating shaft 12 is running through the first hinged joint 10 for the hinge of the first connecting rod 4, the second connecting rod 5 and the third connecting rod 6, forming a structure of pivot connection. In addition, a corner damping (not shown in the figure) is disposed in the shaft 12 for buffering the panel when titled to a certain angle, so as to reduce the local impact on the supporting structure caused by the offset of the center of the gravity. Moreover, another rotating shaft can also be arranged in the second hinged joint 11, and a corner damping is also disposed in the shaft for achieving the buffering effect.

The foregoing is only the preferred embodiment of the invention, not thus limiting embodiments and scope of the invention.

The present invention also has following embodiments based on the above embodiments:

In a further embodiment of the present invention, as shown in FIGS. 2-4*a* to 2-4*d*, the pushing portion 9 is an electric cylinder, which is used as a power system to support stress and complete folding and unfolding of the panels, but the pushing portion 9 can also be an air cylinder and other power equipments, and can even be driven in a manual manner, but should not be limited to these.

In a further embodiment of the present invention, as shown in FIGS. 2-3*d* and 2-4*c*, the fourth connecting rod 7 has a blind hole or a through-hole (not shown in the figure) at one end, one end of the pushrod 8 being running through the blind hole or the through-hole, and in this embodiment, the fourth connecting rod 7 is integrally formed into a L-shaped form to ensure the effectiveness in the direction of thrust during unfolding movement.

In a further embodiment of the present invention, one end of the upper panel 1 and one end of the lower panel 2 are hinged together by a hinge. Moreover, since both the upper panel and the lower panel are made of profiles having internal gaps in the structure, the folding and unfolding mechanism can be easily concealed in the gaps. Alternatively, the folding and unfolding mechanism can also be arranged on the side of the upper panel 1 and the lower panel 2; moreover, panels, all the hinged joints of the four-connecting-rod and convex edge structure are also arranged on the side of the upper panel l and the lower panel 2, through which the technical effect having structure concealed can also be achieved.

In a further embodiment of the present invention, the fourth connecting rod 7 has a through-hole at the other end. One end of the pushrod 8 passes through the through-hole, and is hinged to the rotating shaft 12 running through the first hinged joint 10.

In a further embodiment of the present invention, as shown in FIGS. 2-3*c* and 2-4*b*, the first hinged joint 10 extends outwards, forming a projection 21, and when the folding and unfolding mechanism is folding and unfolding, the projection 21 abuts against one side of the fourth connecting rod 4 to limit a relative position of the third connecting rod 6 and the fourth connecting rod 7.

In a further embodiment of the present invention, the folding and unfolding mechanism is received in the upper and lower panels in a folded state. The mechanism structure is simplified and is concealed in the two panels without compromising the performance of folding and unfolding movements, thus occupying small space; the triangular third connecting rod 6 is integrally formed into a jacking structure through two hinged joints and one top point, which can effectively solve the problem that the included angle between two connecting rods is so small that thus is insufficient; a corner damping is disposed in the rotating shaft 12 for providing buffering when the panel is tilted to a certain angle, so as to reduce the local impact on the supporting structure caused by the offset of the center of the gravity.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A folding and unfolding mechanism, mounted between an upper panel and a lower panel which are hinged together, for folding and unfolding the upper panel and the lower panel, and for overturning for 0-180 degrees between the upper panel and the lower panel, comprising:

a four-connecting-rod assembly, comprising a first connecting rod, a second connecting rod, a third connecting rod and a fourth connecting rod; wherein one end of the first connecting rod is hinged to one end of the second connecting rod, the other end of the first connecting rod is hinged to the upper panel, the other end of the second connecting rod is hinged to the lower panel, and a first hinged joint is formed at a hinged end of the first connecting rod and the second connecting rod, a middle part of the third connecting rod is hinged to the first connecting rod and the second connecting rod through the first hinged joint, the third connecting rod has a second hinged joint at one end, one end of the fourth connecting rod is hinged to the third connecting rod through the second hinged joint, the third connecting rod is provided with a third hinged joint relative to the other end of the first hinged joint;

a pushrod assembly, comprising a pushrod and a pushing portion; wherein one end of the pushrod is fixedly connected to an other side, which is relative to the third connecting rod, of the fourth connecting rod, and the other end of the pushrod is connected to the pushing portion, the pushing portion is mounted on the lower panel for driving the pushrod to move.

2. The folding and unfolding mechanism as claimed in claim 1, further comprising:

an axial locking mechanism, comprising an inner sleeve, a middle sleeve and an outer sleeve; wherein the middle sleeve is sleeved outside the inner sleeve, while the outer sleeve is sleeved outside the middle sleeve, and the interior of the inner sleeve is provided with two pawls, one end of each of the two pawls is hinged to each other through a positioning shaft rotatablely connected to an inner wall of two sides of the inner sleeve, the other end of each of the two pawls has a compression spring, and one end of the inner sleeve is hinged to the other end, relative to the third connecting rod, of the fourth connecting rod, and one end of the outer sleeve is hinged to the third connecting rod through the third hinged joint;

a start skid, wherein one end thereof is hinged to the outer sleeve through the third hinged joint, the other end thereof is facing the upper panel; and a pushing block, arranged at the interior of the outer sleeve, wherein one end of the pushing block is hinged to the other side of the end of the start skid, and the other end of the pushing block abuts against the middle sleeve.

3. The folding and unfolding mechanism as claimed in claim 2, wherein the inner sleeve, the middle sleeve and the outer sleeve can slide relatively to each other, and the start skid has an arc surface at a side relative to the other end of the outer sleeve, wherein the arc surface is facing the upper panel.

4. The folding and unfolding mechanism as claimed in claim 3, wherein two sides of the middle part of the inner sleeve, two sides of the middle part of the middle sleeve and two sides of the outer sleeve are provided with through-holes; wherein pawl parts of the two pawls are respectively running through the through-holes of the inner sleeve, the through-holes of the middle sleeve and the through-holes of the outer sleeve from inside to outside, and end planes of the pawl parts of the two pawls abut against inner walls of the through-holes at two sides of the inner sleeve, the middle sleeve and the outer sleeve.

5. The folding and unfolding mechanism as claimed in claim 1, wherein a first convex edge, extending in the form of rib, is formed at one side of the first connecting rod, and a second convex edge opposite to the first convex edge is arranged on a surface of the upper panel facing the lower panel;

the third connecting rod is generally in a form of triangle, wherein two angles are provided with the first hinged joint and the second hinged joint, respectively, and the third angle is between the first convex edge and the second convex edge when the folding and unfolding mechanism is in a folded state, and abuts against the second convex edge to push the upper panel to perform pre-unfolding when the mechanism is unfolding; the third angle of the third connecting rod is arc-shaped or is provided with a roller.

6. The folding and unfolding mechanism as claimed in claim 5, wherein a rotating shaft is running through the first hinged joint for the hinge of the first connecting rod, the second connecting rod and the third connecting rod.

7. The folding and unfolding mechanism as claimed in claim 6, wherein the first hinged joint extends outwards, forming a projection, and when the folding and unfolding mechanism is folding and unfolding, the projection abuts against one side of the fourth connecting rod to limit a relative position of the third connecting rod and the fourth connecting rod.

8. The folding and unfolding mechanism as claimed in claim 1, wherein the fourth connecting rod is L-shaped from its side.

9. The folding and unfolding mechanism as claimed in claim 1, wherein grooves are arranged on opposite surfaces of the upper panel and the lower panel, and the two grooves together form an accommodation space in which the four-connecting-rod assembly is received when the folding and unfolding mechanism is in a folded state.

* * * * *